(12) United States Patent
Jahnich et al.

(10) Patent No.: US 6,725,374 B1
(45) Date of Patent: Apr. 20, 2004

(54) METHOD FOR THE EXECUTION OF AN ENCRYPTION PROGRAM FOR THE ENCRYPTION OF DATA IN A MICROPROCESSOR-BASED PORTABLE DATA CARRIER

(75) Inventors: Michael Jahnich, Paderborn (DE); Guido Wueppenhorst, Paderborn (DE); Werner Doppmeler, Rietberg (DE)

(73) Assignee: Orga Kartensysteme GmbH, Paderborn (DE)

( * ) Notice: Subject to any disclaimer, the term of this patent is extended or adjusted under 35 U.S.C. 154(b) by 0 days.

(21) Appl. No.: 09/377,713

(22) Filed: Aug. 20, 1999

(30) Foreign Application Priority Data

Aug. 20, 1998 (DE) .......................... 198 37 808

(51) Int. Cl.$^7$ ................................ H04L 9/00
(52) U.S. Cl. ................ 713/190; 713/159; 713/193; 380/205; 380/216; 380/268
(58) Field of Search ................. 713/176, 193, 713/159, 190, 189, 172; 380/216, 205, 268, 36

(56) References Cited

U.S. PATENT DOCUMENTS

| | | | | |
|---|---|---|---|---|
| 5,623,548 A | * | 4/1997 | Akiyama et al. | 380/28 |
| 5,838,796 A | * | 11/1998 | Mittenthal | 380/28 |
| 6,061,449 A | * | 5/2000 | Candelore et al. | 380/28 |

OTHER PUBLICATIONS

C2–Intern; Edition No. 67; Jul. 15, 1998, 2 sheets.

* cited by examiner

Primary Examiner—Thomas R. Peeso
(74) Attorney, Agent, or Firm—Foley & Lardner

(57) ABSTRACT

A method for the execution of an encryption program for the encryption of data in a microprocessor-based portable data carrier is described, with the encryption program comprising several parallelisationable subprograms. According to the invention the serial order of execution of at least two subprograms is randomly permuted in the execution of the encryption program under the consideration of at least one random number.

21 Claims, 7 Drawing Sheets

Table of the start addresses of parallelisationable subprograms

| |
|---|
| 1. Start address of subprogram to be executed as the first one is e.g. S1 |
| 2. Start address of subprogram to be executed as the second one is e.g. S2 |
| 3. Start address of subprogram to be executed as the third one is e.g. S3 |
| 4. Start address of subprogram to be executed as the fourth one is e.g. S4 |

*Fig.6*

Permutation of Start Addresses by means of Random Numbers

Generation of a pair of random numbers by means of a random number generator

Example: $Z1 = 2$
$Z2 = 4$

⇨ The start address in the 2nd line of the start address table is replaced by the start address in the 4th line.

⇨ New Start address table

| 1. | Start address of subprogram S1 |
|---|---|
| 2. | Start address of subprogram S2 |
| 3. | Start address of subprogram S3 |
| 4. | Start address of subprogram S4 |

New determination of a pair of random numbers

Example: $Z1 = 4$
$Z2 = 3$

⇨ The start address in the fourth line of the start address table is replaced by the start address of the third line.

⇨ New Start address table

| 1. | Start address of subprogram S1 |
|---|---|
| 2. | Start address of subprogram S4 |
| 3. | Start address of subprogram S2 |
| 4. | Start address of subprogram S3 |

Permuted program sequence with respect to the order of execution of subprograms

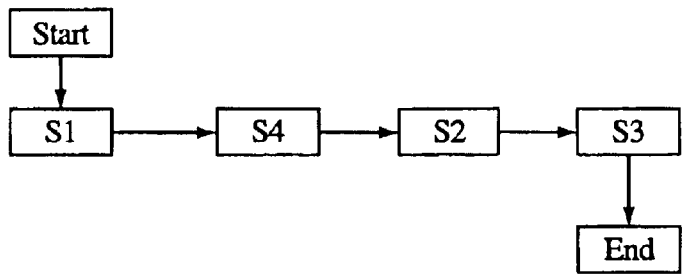

*Fig. 7*

METHOD FOR THE EXECUTION OF AN ENCRYPTION PROGRAM FOR THE ENCRYPTION OF DATA IN A MICROPROCESSOR-BASED PORTABLE DATA CARRIER

BACKGROUND OF THE INVENTION

1. Field of the Invention

The invention relates to a method for the execution of an encryption program for the encryption of data in a microprocessor-based portable data carrier. A data carrier of this type is, for example, a chip card which is connected with a corresponding card terminal or data exchange equipment for data exchange and energy supply.

2. Description of the Related Art

Microprocessor chip cards which are able to encode data by means of an encryption program are employed in the form of, for example, bank cards or access authorization cards in mobile radio networks to the GMS standard. The encryption of data and information in this field is attributed an ever increasing importance. The requirements which are imposed on the encoding security against attacks consequently become more demanding.

Portable data carrier chip cards are generally not provided with their own energy supply, e.g. in the form of a battery or a solar cell. The energy supply of the portable data carrier is effected by the data exchange equipment which is also used for the communication. The surface of chip cards comprises electrical contact areas in order to enable communication with the data exchange equipment via corresponding contacts within same. One of these contact areas is intended for the delivery of the supply voltage and the supply current. Another contact area serves as a ground connection, one is used for the serial bi-directional data communication from and to the data exchange equipment, one provides for the supply of the clock signal, and still another contact area is intended for the receipt of a reset signal.

Portable data carriers typically comprise an integrated semiconductor module which includes a microprocessor with a read only memory (ROM), a random access memory (RAM) in which the operating system or portions of same are stored, and an electrically erasable programmable read only memory (EEPROM). The portable data carrier thus represents a microcomputer unit which, however, requires an external (external from the portable data carrier) voltage and current supply. The microprocessor provides the processing circuits for the execution of programs, in particular of encryption programs which are stored in the EEPROM and/or the ROM. Here, secret codes which are not accessible from outside are stored as well. The codes are used for the coding or encryption of data. Due to the fact that the encryption programs (algorithms) as such are mostly known, the security with respect to the coding of data is restricted to the secret codes. The encrypted data is thus a function of the encryption program depending on the uncoded data (plain text) and at least one secret code:

$$D_{encry'ed} = S(K_{code}, data);$$

where S is the coding program, $D_{encry'ed}$ is the encrypted data, and $K_{code}$ indicates the secret code.

An encryption program of this type which is generally known, for example, is the so-called DES algorithm. An encryption program of this type consists of several serial program levels (function blocks) which, in turn, have several subprograms, with the sequence of execution of certain subprograms having no influence on the result of the encryption. These are referred to as parallelisationable subprograms which, however, are executed sequentially in the portable data carrier. Sub-programs in this sense can be: procedures, routines and commands.

Due to the physical construction and the physical properties of the semiconductor chips which are employed in the portable data carriers, the current or power consumption of the portable data carrier is not constant during the execution of programs, but rather is subject to fluctuations over time. It has been found that the fluctuations of the supply current correlate with certain program commands and with the binary structure (number of zeros and ones) of the data to be processed. The fluctuations might even occur in synchronism with the clock which operates the portable data carrier. For an unauthorized user who is familiar with the technique, it is quite simple to record these fluctuations of the supply current which is fed from the data exchange equipment to the portable data carrier by means of a persistent storage oscillograph by means of a measuring resistor installed in the supply line, with the voltage drop across same is recorded by said oscillograph. In view of the design of encryption programs in portable data carriers, the attacker has the possibility to draw conclusions with respect to the used secret codes and/or the encrypted data via the recording of the current fluctuations during the execution of the encryption program. This is facilitated by the fact that the encryption programs including the subprograms used therein are known as such. If an attacker records the current fluctuations for a plurality of encryptions with different data each, he will be able to draw conclusions as to the used code(s) from differences in the respective current fluctuation characteristics. For this purpose, the attacker may utilize analytical means and correlation methods which are known from mathematics. If the attacker was successful in finding the secret code in this manner, the encryption security is no longer ensured because the encryption programs as such are known. In particular, in the case of symmetrical encryption programs which use one single code for encoding and decoding, the attacker would be in a position to decode encrypted data.

Such an attack on the security of portable data carriers is referred to as differential power analysis (DPA). As a solution of this problem, C2-Intern, Issue No. 67, dated Jul. 15, 1998, (hereby incorporated by reference) proposes to provide an additional electronic circuit in the portable data carrier which is intended to compensate the current fluctuations so that an attacker can no longer determine same and draw conclusions therefrom.

This solution is, however, very expensive because it requires the implementation of an additional electronic component. Due to the fact that the chip card market, in particular, is a mass market, the price pressure is correspondingly high so that such an expensive solution is not acceptable.

SUMMARY OF THE INVENTION

It is therefore the object of the invention to render portable data carriers of the above mentioned type more secure in an effective, simple and economical manner against an attack on the security in data encryption.

The method according to the present invention comprises the steps of: connecting a portable data carrier with a data exchange equipment for data communication; randomly permuting a serial order of execution of at least two of a plurality of parallelisationable subprograms of an encryption program; and executing the encryption program with parallelisationable subprograms in a serial order pursuant to the step of randomly permuting.

At least one random number may be generated in a random number generator of the portable data carrier to randomly permute the serial order. The random number generator may be implemented as a program in the portable data carrier. Alternatively, the random number may be transmitted from the data exchange equipment to the portable data carrier.

The step of randomly permuting may comprise randomly permuting a serial order of execution of at least two of a plurality of parallelisationable subprograms in each of a plurality of successive program sequence levels within the encryption program.

Alternatively, the step of randomly permuting may comprise randomly permuting a serial order of execution of at least two of a plurality of parallelisationable subprograms in at least one of a plurality of successive program sequence levels within said encryption program.

The serial order of a program sequence level may be permuted immediately prior to entering said program sequence level.

The step of randomly permuting may further comprise the steps of: storing the serial order of execution in a table provided in the portable data carrier; generating a first and a second random number, the first and second random numbers corresponding to positions of the parallelisationable subprograms in the serial order; and permuting the positions of the parallelisationable subprograms, a position of a first subprogram corresponding to the first random number being exchanged with a position of a second subprogram corresponding to the second random number. This step of randomly permuting may be executed at least twice.

The method according to the invention may further comprise the step of: prior to the step of randomly permuting, supplementing the encryption program with at least one dummy subprogram, the dummy program being not associated with the encryption program, wherein the dummy subprogram is included in the serial order subjected to the step of randomly permuting. The execution of at least one dummy subprogram may be omitted from the encryption program. The step of supplementing may supplement the program sequence levels with dummy subprograms in a manner that results in each of the plurality of program sequence levels having an equal number of subprograms.

BRIEF DESCRIPTION OF THE DRAWINGS

In the following, the invention will be described in more detail with reference to the accompanying drawings in which:

FIG. 6 shows a table with the start addresses of parallelisationable subprograms; and FIG. 7 shows the permutation of start addresses by means of random numbers and the correspondingly changed execution sequence of the subprograms.

DETAILED DESCRIPTION OF THE PREFERRED EMBODIMENT

According to the present invention, the execution of encryption programs which comprise several subprograms is effected in such a manner that the time sequence of execution of at least two parallelisationable subprograms is randomly permuted under consideration of at least one random number at each program execution. Parallelisationable programs of DES encryption programs are, for example, so-called S boxes which are known to those with skill in the art.

This approach according to the invention randomly generates current fluctuations in a manner which the attacker cannot anticipate, and which considerably impede or even forbid drawing conclusions from the recorded current fluctuations as to the secret code or the encrypted data. The higher the number of random permuted subprograms, the more "chaotic" the current fluctuations and the more difficult for the attacker to find out secret data by means of a mathematical analysis of the current fluctuations.

The method according to the invention can be implemented in terms of programs (software) into the portable data carrier in a simple and economic manner. Additional electronic components are not necessary.

Figure 1:
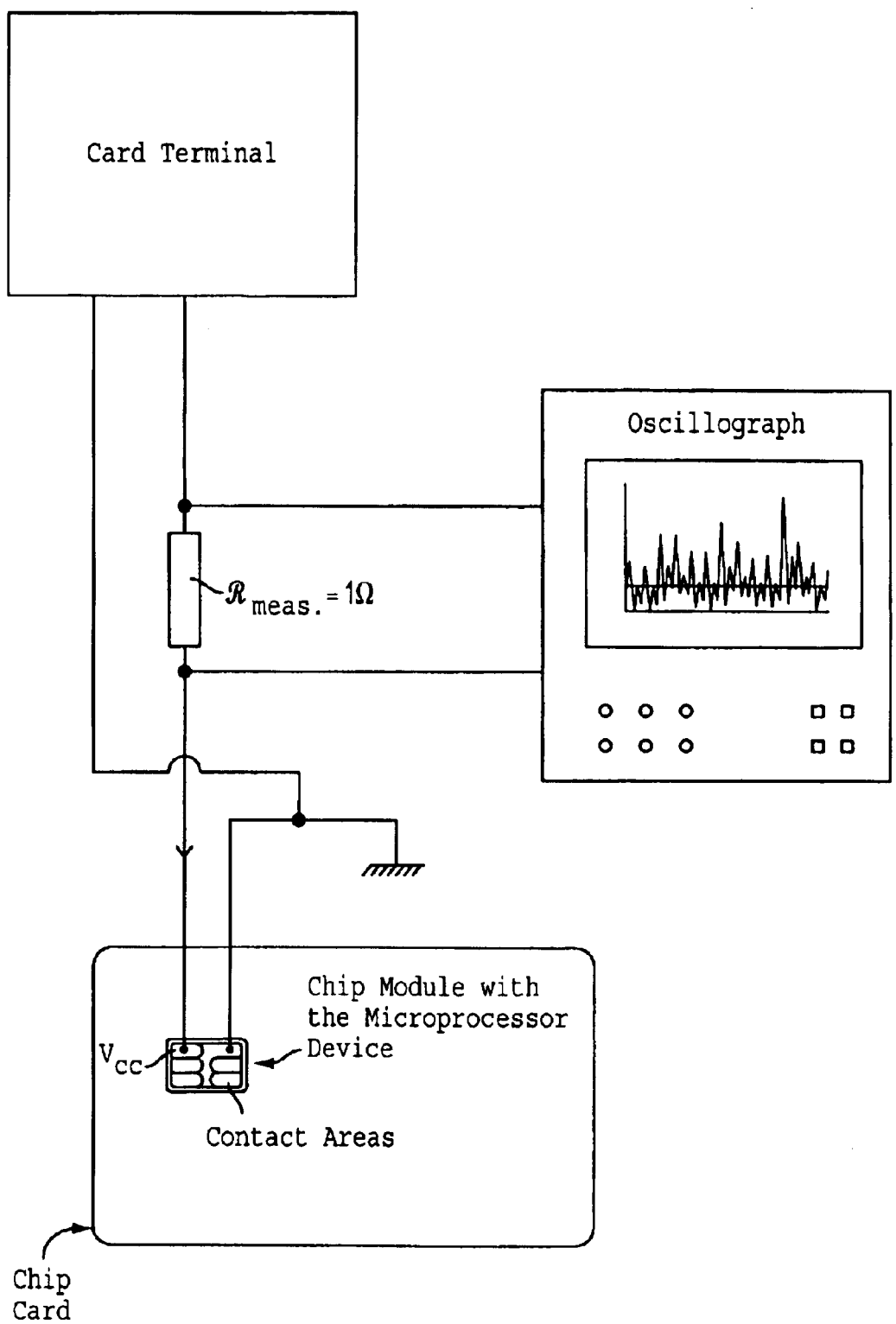
FIG. 1 shows a test arrangement for the recording of current fluctuations during the execution of an encryption program.

FIG. 1 shows schematically a portable data carrier in the form of a micro-processor chip card. The integrated semiconductor device with the microprocessor and the memories (RAM, ROM, EEPROM) is located in a chip module which is installed as a separate component into the card body. The electrical contact areas for the data exchange and for the energy supply in connection with the data exchange equipment (a card terminal in FIG. 1) are arranged on the chip module. For the sake of clarity, the current and voltage supply line only from the card terminal to the corresponding contact area as well as the ground line are illustrated. For the above-described DPA attack on the chip card, a measuring resistor (of 1 Ω, for example) is installed by the attacker into the current supply line, and the current fluctuations are indirectly measured via the voltage drop across the resistor and recorded in a persistent storage oscillograph.

Figure 2:
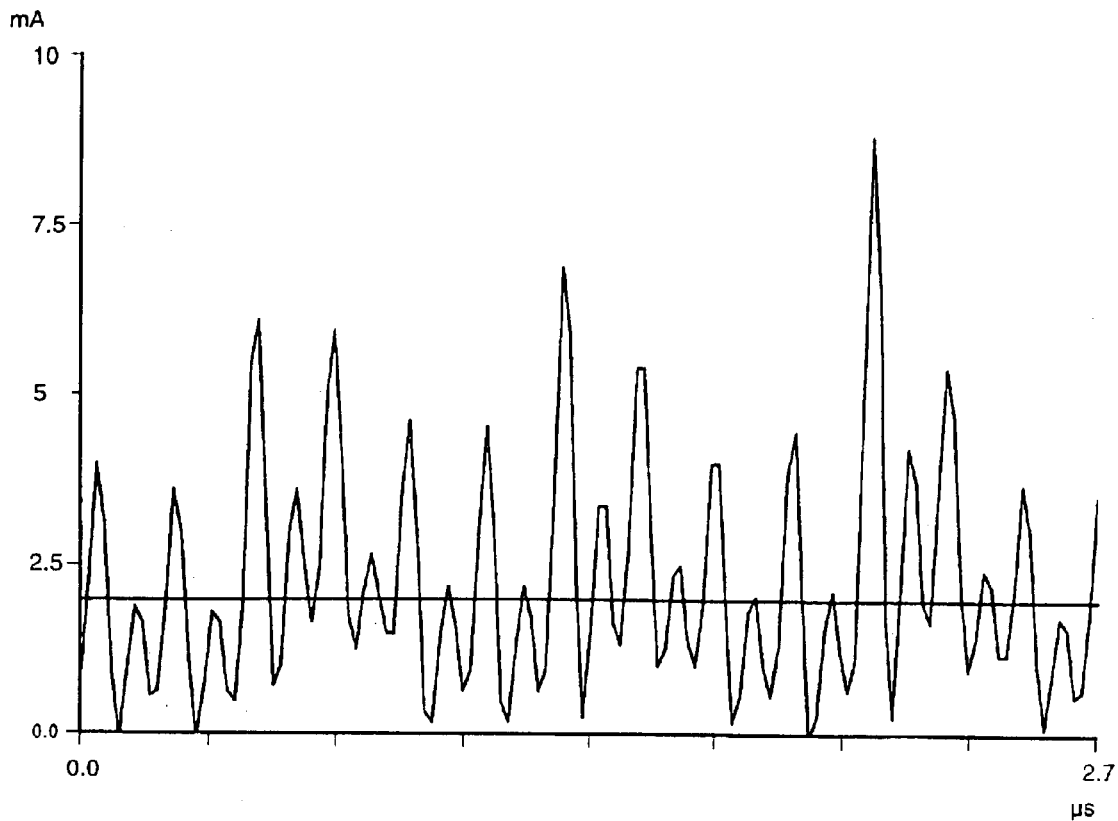
FIG. 2 shows an example of the time characteristic of the supply current during the execution of an encryption program.

As can be seen from FIG. 2, the amplitudes of the current fluctuations, which can occur during the execution of an encryption program, at some place amount to a multiple of the average current consumption (direct current proportion). An attacker might now have the encryption program in the chip card executed several times, each time having recorded the current fluctuations and, by means of mathematical analytic methods, attempt to find out whether there are correlations between the individual recordings. He might, for example, try to find out whether during the various executions of the encryption program, identical current fluctuations occurred at a certain instance (time interval) which are characteristic for the processing of data (data in this sense is also secret codes) with a certain bit pattern structure and/or which are characteristic for the execution of certain commands. If the attacker knows the encryption program and knows at which places in the program sequence, codes, for example, are normally processed or certain commands executed, he can determine otherwise secret codes.

Figure 3:
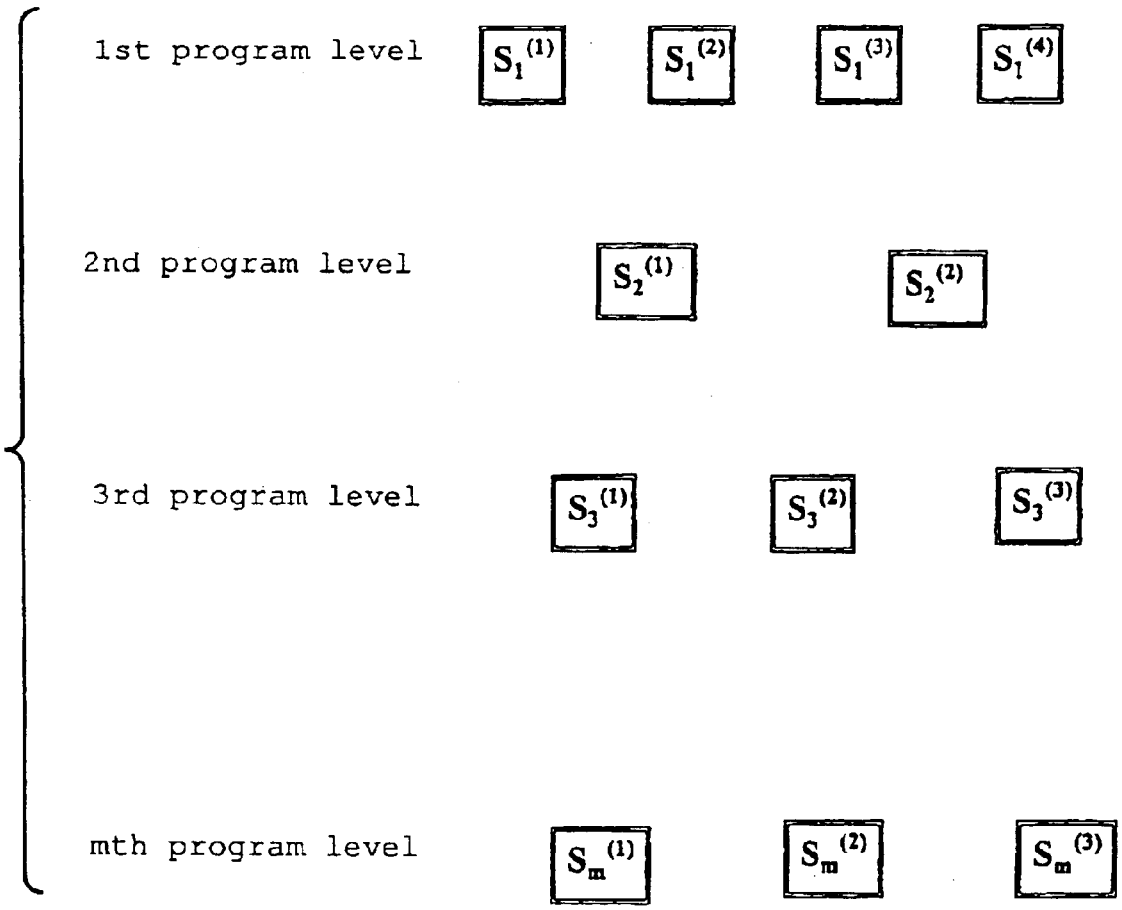
FIG. 3 shows a schematic structure diagram of an encryption program.
Figure 4:
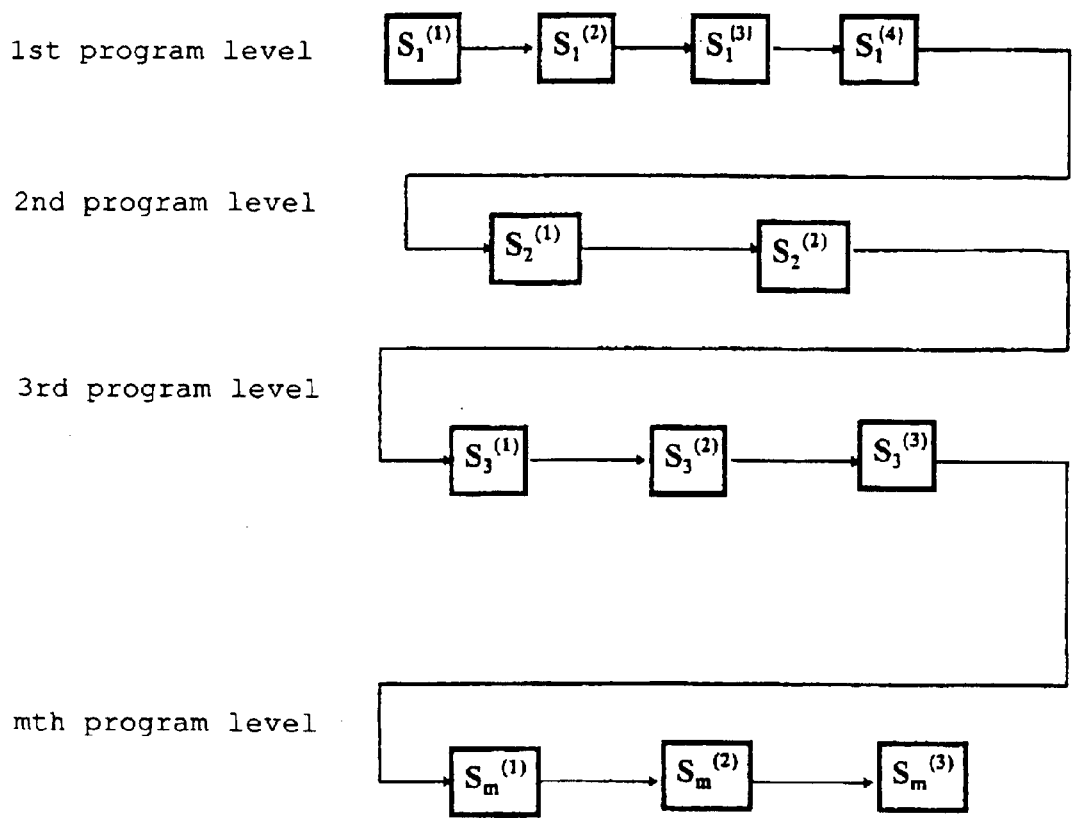
FIG. 4 shows the fixed program run at the execution of an encryption program according to the state of the art.

FIG. 3 shows a schematic structure diagram of an encryption program (S). A program of this type consists of several sequential program levels (1 to m). Within these program levels there are various subprograms, at least a few of which are parallelisationable (i.e., the order in which these programs are serially executed is insignificant). According to the prior art as shown in FIG. 4, however, the serial order of the execution of these parallelisationable subprograms is determined once and for all by the programmer with the consequence that the program run by the encryption program with its subprograms is always the same. Even if the attacker does not know the order of the execution of the subprograms which as such are parallelisationable, he will still be able to find it out by means of a DPA attack if he has the encryption program executed a sufficient number of times and each time records the current fluctuations. Due to the fact that the encryption program run is invariably the same, correlations between the individual current fluctuations can be found which allow drawing conclusions as to the program sequence and, ultimately, as to secret codes.

Due to the fact that the program runs according to the invention differ from one another each time because of a random permutation of parallelisationable subprograms, such correlations can no longer, or only under exceptionally high efforts, be found out by an attacker. The spying out of secret codes is thus effectively prevented or at least considerably impeded.

The random numbers which are used for the random permutation of the subprograms are preferably generated by a random number generator. Such a random number generator can, for example, be implemented in the chip card in the form of a software program. Such programs are known to those with skill in the art. The random number generator can alternatively be an electronic circuit in the portable data carrier (hardware version). As an alternative to the generation of a random number in the chip card, said random number can be transmitted by the card terminal to the chip card.

In an encryption program which comprises several serial program levels with several parallelisationable subprograms each during the program execution, two embodiments are provided for the method according to the invention.

In the first embodiment, prior to the commencement of the actual encryption program, the serial order of the execution of the subprograms on all program levels is established under consideration of the random number(s). It may well be that not all parallelisationable subprograms are necessarily randomly permuted. There may be program levels with parallelisationable subprograms where no random permutation takes place so that in each program run the subprograms of this program level are invariably executed in the same order.

In the second embodiment, the order of the execution of the subprograms in all program levels has not already been established prior to the commencement of the actual encryption program. Here, the serial order of the execution of the subprograms is established for the subprograms in this program level as late as prior to entering a new program level under consideration of (a) random number(s).

For the realization of the permutation of the order of the execution of parallelisationable subprograms, a table is preferably used in which the program start addresses of the parallelisationable subprograms are stored with respect to their position within the order, as shown in FIG. 6. This table is preferably software-generated in the chip card's RAM. The entries in this table are then randomly permuted according to the invention, as will be explained in the following.

The program start addresses are further stored in a non-volatile EEPROM of the chip card. Prior to the start of the actual encryption program the program start addresses of the subprograms are successively loaded from the EEPROM and/or the ROM and written to the RAM. This sets the table, to some extent, to the initial values. Now, as shown in FIG. 7, a pair of random numbers which comprises two random numbers (Z1, Z2) is generated, with the set of possible random numbers corresponding to the set of order positions. If the encryption program includes, for example, four parallelisationable subprograms, there are also four order positions (1, 2, 3, 4) which determine the order of the execution of same. Accordingly, there are also four possible random numbers (1, 2, 3, 4). If the pair of random numbers Z1=2 and Z2=4 is generated, a corresponding program writes the start address of the fourth subprogram to the order position 2 and the start address of the second sub-program to the order position 4, as shown in the first table of FIG. 7.

By means of another generation of a pair of random numbers and the associated new permutation, the order of the execution compared to the initial setting is "mixed up" further. If the second pair of random numbers is (4, 3), for example, then the start address of the second subprogram is written to the order position 3 and the start address of the third subprogram is written to the order position 4, as shown in the second table of FIG. 7.

The order to which the subprograms will now be executed within the encryption program is as follows: first subprogram (S1)/fourth subprogram (S4)/second subprogram (S2)/third subprogram (S3).

Figure 5:
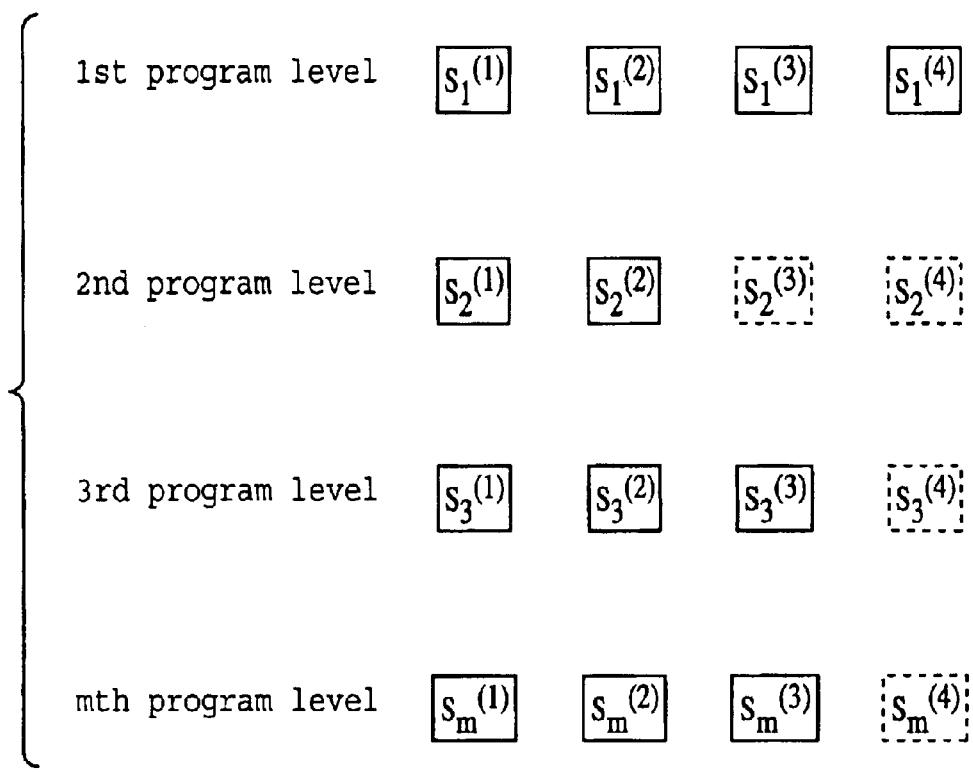
FIG. 5 shows a schematic structure diagram of an encryption program which was supplemented by dummy subprograms (shown in broken lines)

FIG. 5 shows a schematic structure diagram of an encryption program comprising several program levels, which has been extended on certain program levels by so-called "dummy programs". These "dummy programs" are virtually no parts of the encryption program. Their execution does, therefore, not influence the encryption result. On the other hand, however, their execution causes additional advantageous current fluctuations to be observed in a DPA analysis and thus contributes to the confusion of an attacker. "Dummy subprograms" in this sense are again procedures, routines and commands, the execution of which does not influence the encryption as such. Under this aspect they are ballast from a programming stand-point, which favorably counteract a DPA attack, in particular, if these "dummy subprograms" are also randomly permuted. The implementation of "dummy subprograms" and their random permutation does not only generate additional current fluctuations which have nothing to do with the actual encryption program but, in addition, appear randomly distributed over time, which further impedes a DPA attack. Furthermore, it is provided to omit the execution of certain "dummy subprograms" under the consideration of at least one random number, which will cause even more confusion for a DPA attacker.

In the implementation of the encryption program according to the invention each program level could be extended by such a number of "dummy subprograms" that the number of subprograms in each program level is the same.

The method according to the invention is not restricted to so-called contact-operated portable data carriers. It is rather also applicable to so-called contactless operating portable data carriers wherein the data communication and the energy supply with the data exchange equipment is effected by means of electromagnetic radiation (inductively) because in this case, too, the power consumption of the portable data carrier can be determined by means of a measuring arrangement which is modified compared to that of FIG. 1.

The invention can, of course, be employed in the execution of decoding programs, too, and not only of encryption programs because the above described problems are the same. Moreover, decoding is nothing but an inverse encryption and vice versa.

For convenience of explanation, the present invention has been described in the context of hardware data exchange equipment where the connection is a physical or inductive connection. However, the invention is not so limited. The invention could also be implemented by receiving signals remotely via satellite or other convenient transmission. No physical or inductive connection would be necessary to the data exchange equipment, but only a receiver. A battery power source may or may not be disposed on the chip module.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method for encryption or decryption of data in a portable data carrier comprising the steps of:
    disposing said portable data carrier for data communication;
    randomly permuting a serial order of execution of at least two of a plurality of parallelisationable subprograms of an encryption or decryption program; and
    executing said encryption program with parallelisationable subprograms in a serial order controlled, at least in part, by said step of randomly permuting.

2. The method according to claim 1, wherein said randomly permuting step comprises generating at least one random number in a random number generator of the portable data carrier to randomly permute said serial order.

3. The method according to claim 2, wherein said generating step comprises operating a random number generator program in the portable data carrier.

4. The method according to claim 1, wherein said randomly permuting step comprises transmitting a random number to the portable data carrier to randomly permute said serial order.

5. The method according to claim 1, wherein said step of randomly permuting comprises randomly permuting a serial order of execution of at least two of a plurality of parallelisationable subprograms in at least two of a plurality of successive program sequence levels within said encryption program.

6. The method according to claim 5, wherein the serial order of a program sequence level is randomly permuted immediately prior to entering said program sequence level.

7. The method according to claim 5, wherein said step of randomly permuting, for at least two of said plurality of successive program sequence levels, comprises the steps of:
    storing said serial order of execution in a table provided in said portable data carrier;
    generating a first random number and a second random number, said first and second random numbers corresponding to positions of said parallelisationable subprograms in said serial order; and
    permuting said positions of said parallelisationable subprograms, a position of a first subprogram corresponding to said first random number being exchanged with a position of a second subprogram corresponding to said second random number.

8. The method according to claim 7, wherein said step of randomly permuting is executed at least twice during performance of said method.

9. The method according to claim 5, further comprising the step of:
    prior to said step of randomly permuting, supplementing at least one of said plurality of said successive program levels of said encryption program with at least one dummy subprogram, said dummy program not influencing an encryption or decryption result,
    wherein said dummy subprogram is included in said serial order subjected to said step of randomly permuting.

10. The method according to claim 9, wherein execution of at least one dummy subprogram is omitted from said encryption program.

11. The method according to claim 9, wherein said step of supplementing supplements said program sequence levels with dummy subprograms in a manner that results in at least two of said plurality of program sequence levels having an equal number of subprograms.

12. The method according to claim 1, wherein said step of randomly permuting comprises randomly permuting a serial order of execution of at least two of a plurality of parallelisationable subprograms in at least one of a plurality of successive program sequence levels within said encryption program.

13. The method according to claim 12, wherein the serial order of a program sequence level is randomly permuted immediately prior to entering said program sequence level.

14. The method according to claim 1, wherein said step of randomly permuting comprises the steps of:
    storing said serial order of execution in a table provided in said portable data carrier;
    generating a first random number and a second random number, said first and second random numbers corresponding to positions of said parallelisationable subprograms in said serial order; and
    permuting said positions of said parallelisationable subprograms, a position of a first subprogram corresponding to said first random number being exchanged with a position of a second subprogram corresponding to said second random number.

15. The method according to claim 14, wherein said step of randomly permuting is executed at least twice during performance of said method.

16. The method according to claim 1, further comprising the step of:
    prior to said step of randomly permuting, supplementing said encryption program with at least one dummy subprogram, said dummy program not influencing an encryption or decryption result, wherein said dummy subprogram is included in said serial order subjected to said step of randomly permuting.

17. The method according to claim 16, wherein execution of at least one dummy subprogram is omitted from said encryption program.

18. A portable data carrier, comprising:

a card; and a microprocessor-usable storage medium having a microprocessor-readable program code embodied therein for causing encryption or decryption or data, including program code for randomly permuting a serial order of execution of at least two of a plurality of parallelisationable subprograms of said encryption or decryption program.

19. The portable data carrier according to claim 18, wherein said program code generates at least one random number in a random number generator of the portable data carrier to randomly permute said serial order.

20. The portable data carrier according to claim 18, wherein said program code randomly permutes a serial order of execution of at least two of a plurality of parallelisationable subprograms in at least one of a plurality of successive program sequence levels within said encryption or decryption program.

21. The portable d data carrier according to claim 18, wherein said program code is a program code for:

storing a serial order of execution in a table provided in said portable data carrier;

generating a first random number and a second random number, said first and second random numbers corresponding to positions of said parallelisationable subprograms in said serial order; and permuting said p positions of said parallelisationable subprograms, a position of a first subprogram corresponding to said first random number being exchanged with a position of a second subprogram corresponding to said second random number.

* * * * *